(12) United States Patent
Lau et al.

(10) Patent No.: US 7,481,487 B2
(45) Date of Patent: Jan. 27, 2009

(54) VEHICLE FRONT END

(75) Inventors: Chelsia Lau, Ann Arbor, MI (US); Jennifer Baffy, Westland, MI (US); Shawn Morgans, Chelsea, MI (US); Peter MacLean, Clinton Township, MI (US); Daniel Scalici, Clinton Township, MI (US); Girard Moore, Macomb Township, MI (US)

(73) Assignees: Ford Global Technologies, LLC, Dearborn, MI (US); Decoma International Corp, Concord (CA)

( * ) Notice: Subject to any disclaimer, the term of this patent is extended or adjusted under 35 U.S.C. 154(b) by 502 days.

(21) Appl. No.: 11/275,868

(22) Filed: Feb. 1, 2006

(65) Prior Publication Data

US 2007/0176441 A1    Aug. 2, 2007

(51) Int. Cl.
*B60R 19/03* (2006.01)

(52) U.S. Cl. .............. 296/193.1; 293/115; 293/120; 180/68.1

(58) Field of Classification Search .............. 296/193.1, 296/203.02; 293/115, 120; 180/68.1, 68.4, 180/68.3
See application file for complete search history.

(56) References Cited

U.S. PATENT DOCUMENTS

| | | | |
|---|---|---|---|
| 6,527,333 B2 * | 3/2003 | Hewitt et al. | 296/180.1 |
| 6,979,053 B2 * | 12/2005 | Kim | 296/193.09 |
| 7,290,809 B2 * | 11/2007 | Filip et al. | 293/115 |

* cited by examiner

*Primary Examiner*—Joseph D Pape
(74) *Attorney, Agent, or Firm*—Damian Porcari (57) ABSTRACT

The present invention relates to a novel fascia, grille and the assembly of the fascia and grille. The grille is designed to overly the fascia and close both an upper and lower air intake opening. The fascia supports the grille and receives fasteners from the grille to form an assembly. The fascia includes a horizontal portion. The grille includes a horizontal portion sized to receive a bumper beam.

23 Claims, 7 Drawing Sheets

VEHICLE FRONT END

BACKGROUND OF THE INVENTION

Since their inception, vehicles have included a grille to protect the engine from debris and a bumper to protect the vehicle from frontal impacts. Innumerable variations on grilles and bumpers and combinations of the two have existed to make the air intake closure and frontal protection stylish, functional and efficient. In recent times, the bumper has been replaced with a fascia. A fascia is a flexible covering spanning the width of a vehicle. The fascia overlies a structural bumper beam and provides a decorative and paintable surface. Some fascia designs have included integrated air intake openings and grates, bars or ribs to close these openings. Among the first vehicles to include an integrated fascia/air intake was the 1986 Ford Taurus. It included an upper air intake above the top surface of the fascia and a lower air intake in the fascia itself. A series of thin slits in the lower portion of the fascia provided both and opening for air intake as well as a closure to keep out large objects. Fascias have commonly included an opening for the lower air intake and some means to close the lower air intake against large debris entering the engine compartment.

One design that integrated both upper and lower air intakes into the fascia was the 1984 Ford EXP. This design provided a relatively narrow frontal profile with air intakes both above and below the main horizontal portion of the fascia. This horizontal portion was juxtaposed the vehicle bumper beam. This design did not present a traditional "grille" appearance on the vehicle. The slits in the fascia acted as air intakes and this design did not have a grille as used in this invention. The Ford EXP would be an example of a grille-less design where only a fascia is used to cover the bumper beam and to provide air intake closures for an engine. Modern styling trends have returned to a separate grille, usually having a different texture, finish and appearance from the fascia.

In 2003, the Audi AG showed two concept cars at the Paris Auto Show. Both concept cars had trapezoid-shaped grilles that covered upper and lower air intake openings. This trapezoid-shaped grille design has a horizontal portion. Because these were concept cars, their detailed construction was not available for examination. The 2005 Audi A6 has a grille and fascia similar in external appearance to the 2003 Paris Show Cars. The A6 grille includes a horizontal portion overlying a plastic reinforcement member. This plastic reinforcement member is not integrally formed with either the grille or fascia. This member is secured to the fascia and grille and is juxtaposed a metal bumper beam on the vehicle. The grille horizontal portion is not recessed and becomes the initial frontal impact area. The inclusion of the reinforcement member is likely needed to transfer low speed frontal impacts from the grille to the bumper beam.

SUMMARY OF THE INVENTION

The present invention provides a two-piece fascia and grille assembly that enables the grille and fascia to be made from different materials. The grille and fascia interlock and provide for a simple and economical assembly technique. They also provide a modular design so that different grilles may be used with the same fascia to easily and economically enable different styling designs without changing the fascia. By integrating both the upper and lower air intake closures into one piece, the present design makes the assembly lighter and less costly to produce. If the grille were produced with a chrome appearance, it provides for a horizontal portion across the front of the vehicle. This horizontal grille portion resembles the look of a traditional chrome bumper. Chrome bumpers are popular in light truck and Sport Utility Vehicle applications. By having both the grille and fascia closely conform to the bumper beam, the frontal overhang is reduced. By providing an impact area on the fascia, the grille can be recessed.

The fascia includes a horizontal center portion that is hidden when the grille is attached. The horizontal center portion integrally formed with the decorative portions of the fascia. The horizontal center portion is designed to overly and closely conform to the vehicle bumper beam. This construction eliminates the need for a reinforcement member and reduces the frontal overhang of the fascia and grille assembly. The horizontal center portion is slightly recessed to enable the grille to also be recessed from the primary impact areas of the fascia.

These and other advantages and features of the present invention shall become apparent to those of ordinary skill in the art upon a review of the detailed specification and drawings.

DETAILED DESCRIPTION OF THE PREFERRED EMBODIMENTS

The following are a list of elements and their reference numerals to aid in understanding the invention:
- 10 Vehicle
- 12 fascia and grille assembly
- 14 fascia
- 16 grille
- 18 matting interface
- 20 fascia horizontal center portion
- 22 fascia vertical portions
- 24 upper air intake opening
- 26 lower air intake opening
- 28 groove
- 30 retention slots
- 32 edge
- 34 tabs
- 36 grille horizontal portion
- 38 upper air intake closure
- 40 lower air intake closure
- 42 seam
- 44 bumper beam
- 46 decorative portion
- 48 impact area
- 50 frame The present invention is directed to the individual grille and fascia components that form an assembly as well as the assembly and the assembly attached to a vehicle front end.

Figure 1:
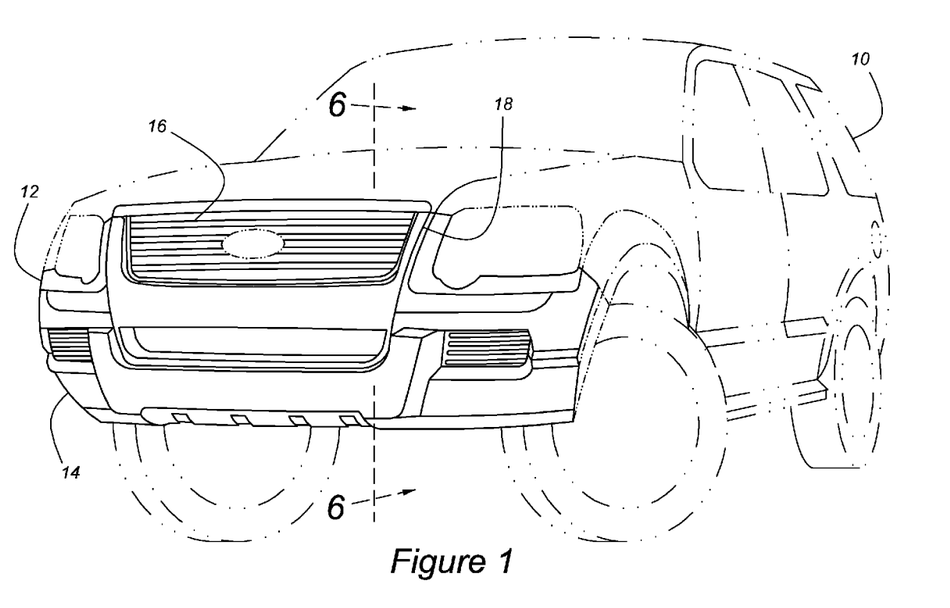
FIG. 1 is a perspective view of the fascia and grille assembly installed on a vehicle.

Illustrated in FIG. 1 is a 2006 Ford Explorer, the first commercial embodiment of the present invention. The invention may of course be adapted to work on other vehicles. In this embodiment, a vehicle 10 includes a fascia and grille assembly 12. The assembly 12 includes a body colored fascia 14 and a chrome finished grille 16. The assembly 12 is secured to the front end of vehicle 10. Not illustrated in this figure is a bumper beam that provides support for the assembly 12 and impact resistance and crush management for the vehicle 10 (not shown in FIG. 1). An example of this construction and the energy management properties thereof is described in commonly assigned U.S. Pat. No. 6,179,355, which is incorporated herein by reference.

Grille 16 provides a tight matting interface 18 with fascia 14. As will be more thoroughly described below, in-turned surfaces of grille 16 and fascia 14 mate in a tongue and groove fashion to provide an attractive and tight fitting seam. This system allows for module grille systems to be interchangeable on different vehicle models using a single fascia. For example, one vehicle model may use a black grille while a different vehicle model may use a chrome finished grille. Both grilles would fit onto the same fascia.

Figure 2:
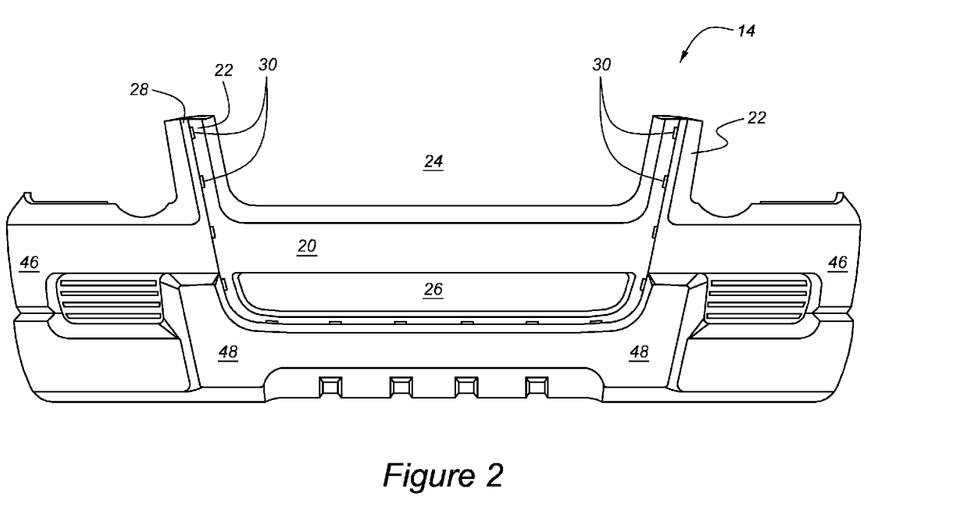
FIG. 2 is a front elevational view of the decorative surface of a fascia.

Illustrated in FIG. 2 is a front elevational view of the fascia 14 without the grille. The fascia 14 includes a horizontal center portion 20 that is generally transverse to the vehicle centerline (not shown) and spans the frontal portion of the vehicle. The decorative portions 46 are generally painted to match the other vehicle body panels. The horizontal center portion 20 is generally recessed with respect to impact areas 48. Generally vertical portions 22 extend from and flank the horizontal center portion 20. The space defined by the horizontal center portion 20 and the vertical portions 22 is the upper air intake opening 24. Below the horizontal center portion 20 is a lower air intake opening 26. The decorative portions 46, horizontal center portion 20 and generally vertical portions 22 are all integrally formed in a single plastic molding. The horizontal center portion 20 is not exposed and need not be painted because it is concealed by a grille.

The fascia 14 includes a generally U-shaped groove 28, at least one wall surface thereof forming a matting surface with the grille. The groove 28 includes pluralities of slots 30 that form a retention surface for tabs on the grille 16. The slots 30 are formed in the bottom of groove 28. While the invention describes and illustrates a groove 28, other means that provide a decorative seam between the fascia and grille are possible such as in-turned edges, overlapping surfaces and butted surfaces.

The vertical portions 22 are formed in a U-shaped cross section to increase the strength and stiffness of the fascia 14 and to provide support for the grille 16 without the need for a separate reinforcement member. This construction enables the grille to be attached to the fascia 14 without the need for separate attachments between the grille 16 and the vehicle 10. This tongue and groove design enables the grille and fascia to form a subassembly that is then attached to the vehicle. Creating a fascia and grille subassembly speeds assembly and increases manufacturing flexibility.

Figure 3:
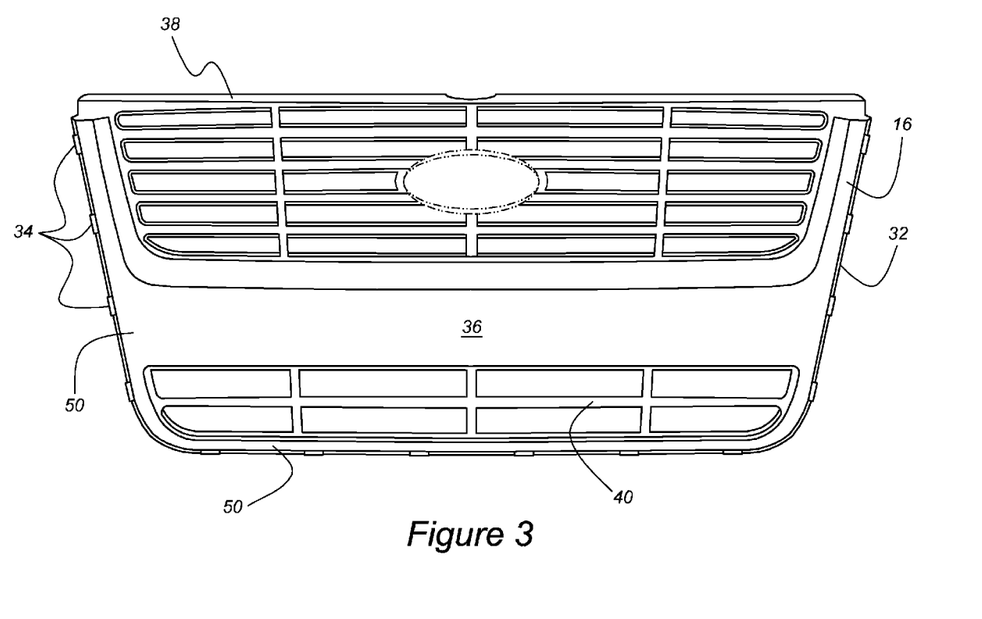
FIG. 3 is a front elevational view of the reverse surface of a grille.

Illustrated in FIG. 3 is the reverse surface of grille 16. This surface is not normally visible. The in-turned perimeter edge 32 fits within groove 28. A series of tabs 34 on edge 32 fit within slots 30. The tabs 34 removably secure the grille 16 to the fascia 14. Of course, the edge and groove of the fascia and grille may be reversed and the edge placed on the fascia and groove placed on the grille. The invention has been illustrated with the grille having an in-turned edge, but other matting surfaces are possible such as a U-shaped edge, edge, overlapping surfaces or butted surfaces.

A horizontal portion 36 overlies horizontal center portion 20. As more fully described below, the horizontal center portion 36 closely conforms and overlies the vehicle bumper beam (illustrated in FIG. 6) and transfers force from the grille 16 to the vehicle crash management system. The embodiment illustrated withstands 5 MPH frontal impacts into a fixed barrier without damage. Because both the grille horizontal portion 36 and the fascia horizontal center portion 20 closely conform to the bumper beam, the frontal overhang of vehicle 20 is reduced.

Grille 16 includes an upper air intake closure 38 closing the upper air intake opening 24 and a lower air intake closure 40 closing the lower air intake opening 26. The closure styles for closures 38 and 40 may be the same or different from each other. They may be of the same or different color, texture, or finish and are used to create a decorative effect. FIG. 3 illustrates the reverse surface of closures 38 and 40, which is normally not visible.

Figure 4:
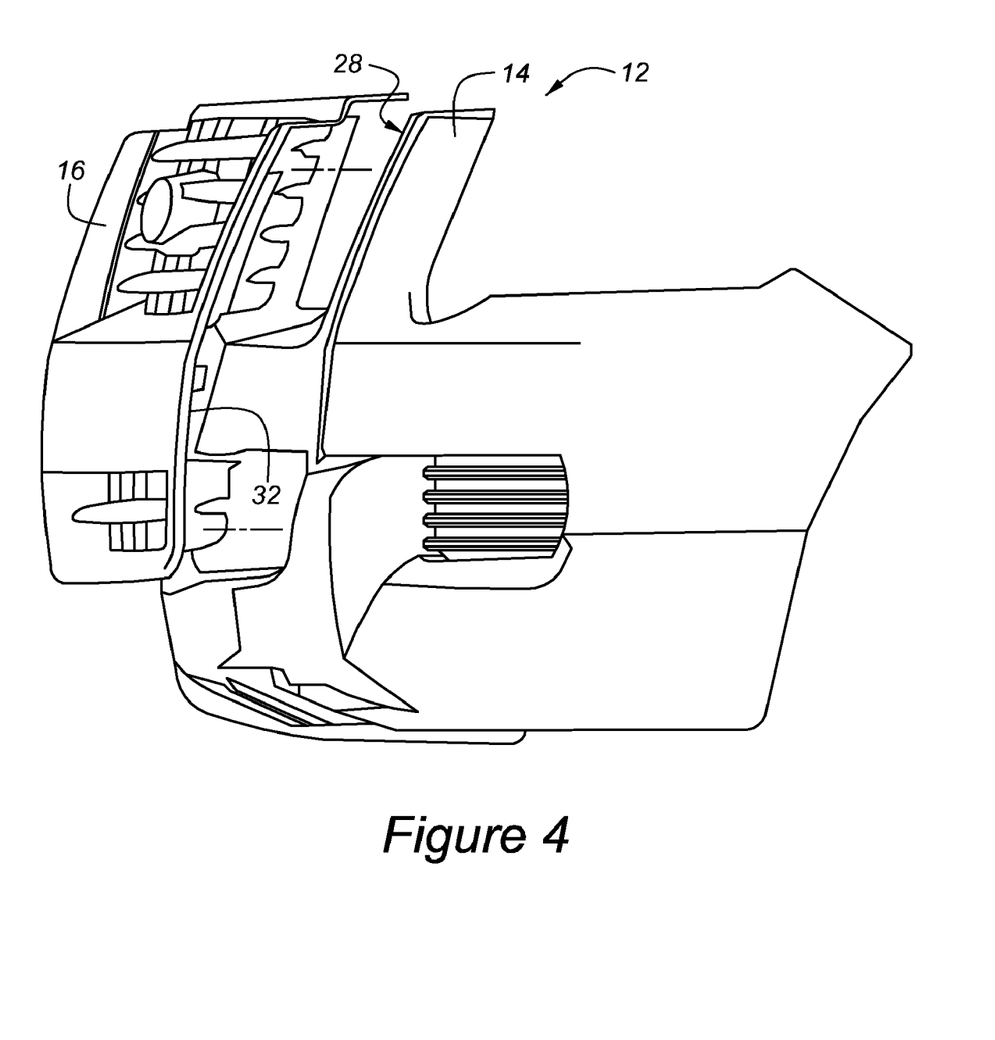
FIG. 4 is an exploded side view of a grille and fascia illustrating how the fascia overlies the grille.
Figure 5:
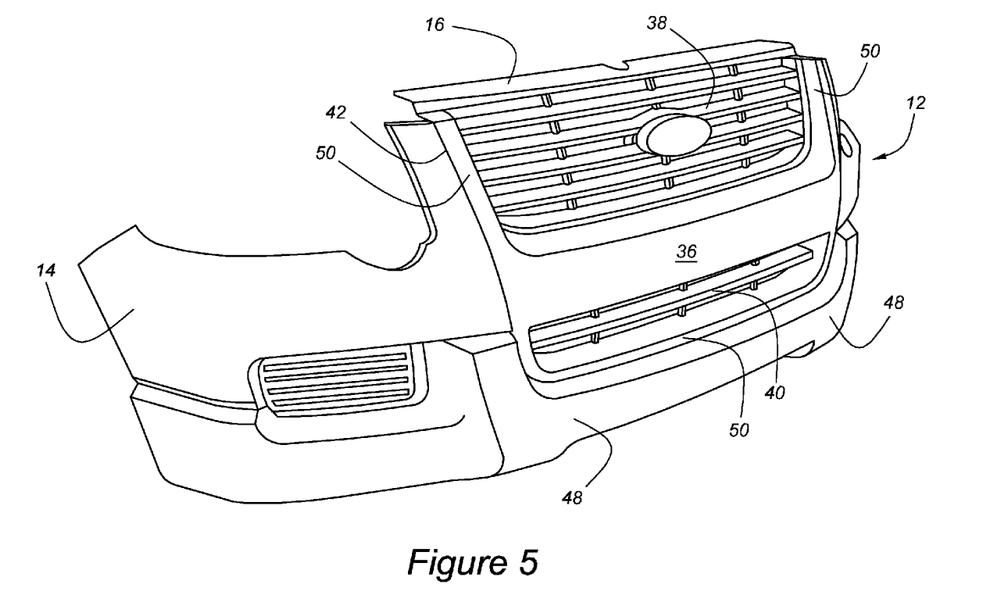
FIG. 5 is a perspective view of the decorative surface of the fascia and grille assembly.

Illustrated in FIG. 4 is an exploded view of fascia 14 juxtaposed grille 16 as the two pieces are assembled into assembly 12. Edge 32 aligns and fits within groove 28. Illustrated in FIG. 5 is a frontal perspective view of grille 16 secured to fascia 14. The in-turned edge 32 of grille 16 fits within groove 28 of fascia 14 to create a decorative seam 42. When grille 16 is made from a highly polished mirrored surface, it is desirable to have this surface slightly recessed from the forward most impact area 48 to protect the surface from scuffs and scraps. A U-shaped frame 50 surrounds closures 38, 40 and horizontal portion 36. Frame 50, closures 38, 40 and horizontal portion 36 are unitary and are integrally from into a single piece.

Figure 6:
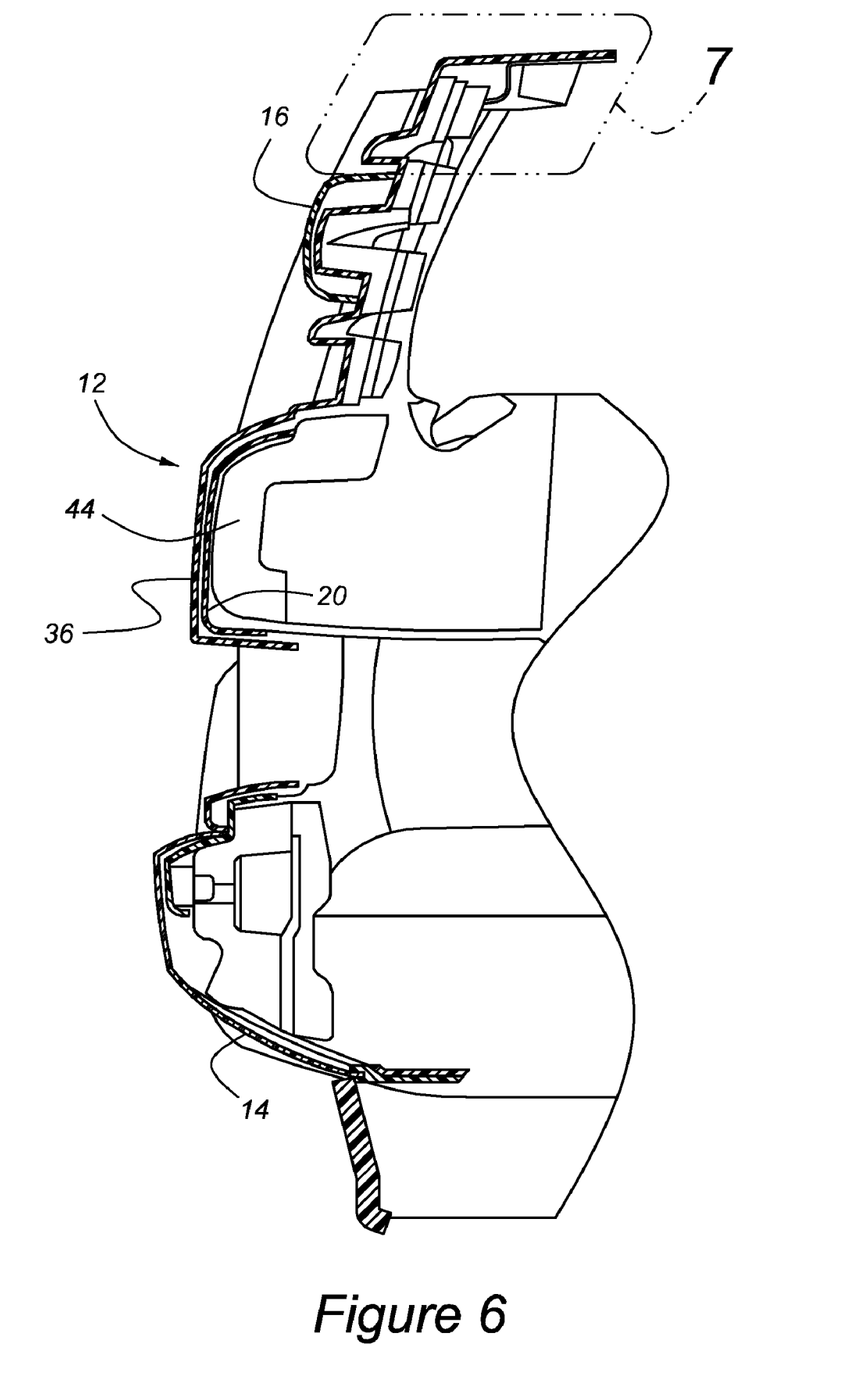
FIG. 6 is a cross-sectional view of the assembly in FIG. 1, taken along the lines 6-6.

Illustrated in FIG. 6 is a cross-sectional view taken along the lines 6-6 in FIG. 1. Fascia 14 is shown partially broken away for clarity. Grille 16 is attached to fascia 14 for form assembly 12. Horizontal center portion 20 and horizontal portion 36 overly and are juxtaposed bumper beam 44. Frontal impacts are transmitted through grille horizontal portion 36 to fascia horizontal center portion 20 and then to bumper beam 44. Bumper beam 44 transmits impact forces to the vehicle energy management system (not shown).

Figure 7:
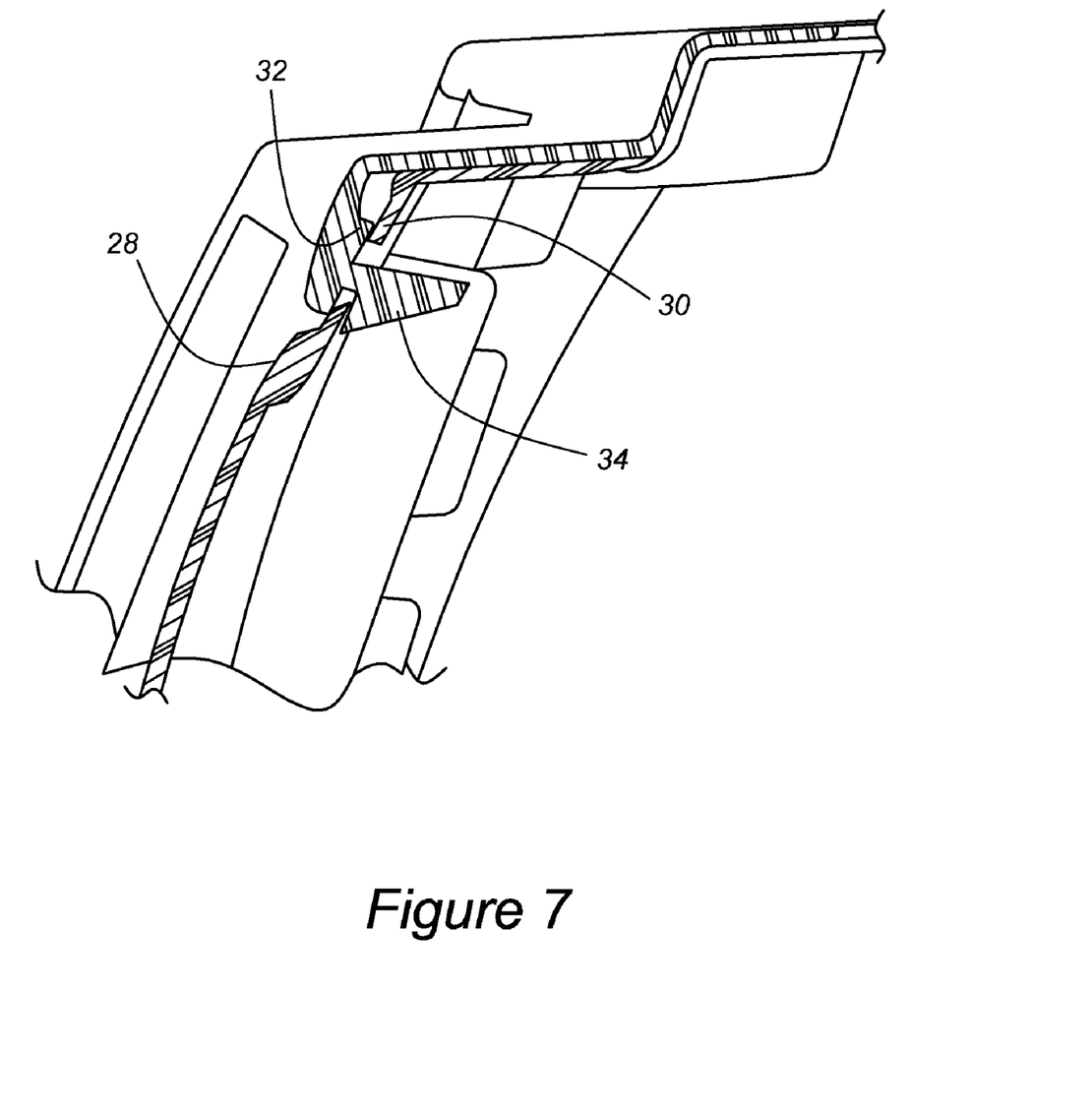
FIG. 7 is a detailed view of the area marked 7 in FIG. 6.

Illustrated in FIG. 7 is a detailed view of the area marked 7 in FIG. 6. More features and details are present in FIG. 7 than are illustrated in FIG. 6. This section was selected so that it intersects groove 28 and shows how tabs 34 on edge 32 fit within slots 30. Tab 34 is shown partially broken away. Tab 34 acts as a removable fastener. The barbed portion of tab 34 engages a surface on slot 30 to retain grille 16 to fascia 14.

Various preferred embodiments of the invention have been described in fulfillment of the various objects of the invention. It should be recognized that these embodiments are merely illustrative of the principles of the invention. Numerous modifications and adaptations thereof will be readily apparent to those skilled in the art without departing from the spirit and scope of the present invention.

What is claimed:

1. A vehicle front fascia designed to span the front portion of a vehicle comprising:
   a decorative portion having an impact area;
   a horizontal center portion integrally formed with said decorative portion, said horizontal center portion designed to closely conform with a vehicle bumper beam, said horizontal center portion being recessed from said impact area;
   a lower air intake opening below said horizontal center portion; and
   fastener retention surfaces that engage fasteners from a grille.

2. The vehicle fascia of claim 1, wherein said fastener retention surfaces are slots.

3. The vehicle fascia of claim 1, wherein said horizontal center portion is concealed by said grille.

4. The vehicle fascia of claim 1, wherein said horizontal center portion includes fastener retention surfaces.

5. The vehicle fascia of claim 4, wherein said horizontal center portion includes slots receiving said grille fasteners.

6. The vehicle fascia of claim 1, further comprising an inwardly turned edge.

7. The vehicle fascia of claim 6, wherein said fascia edge engages an inwardly turned edge of a grille.

8. The vehicle fascia of claim 6, further comprising a generally U-shaped groove receiving an inwardly turned edge of a grille.

9. The vehicle of claim 8, further comprising slots within said groove receiving tabs from said grille.

10. A vehicle grille comprising:
an upper air intake closure;
a lower air intake closure;
a unitary horizontal portion sized to closely conform to a fascia horizontal center portion, said grille horizontal portion separating said upper and lower air intake closures; and
integrally formed fasteners that are designed to engage said fascia.

11. The vehicle grille of claim 10, wherein said fasteners are tabs.

12. The vehicle grille of claim 10, further comprising an inwardly turned edge.

13. The vehicle grille of claim 12, wherein said inwardly turned edge includes tabs that engage a vehicle fascia.

14. The vehicle grille of claim 13, wherein said grille inwardly turned edge engages an inwardly turned edge of a fascia.

15. The vehicle grille of claim 10, wherein said grille is one-piece.

16. The vehicle grille of claim 10, wherein said grille have a chrome finish.

17. The vehicle grille of claim 10, wherein said grille horizontal portion overlies a horizontal center portion of a fascia and frontal impacts are conveyed to said bumper beam through said fascia horizontal center portion.

18. The vehicle grille of claim 10, further comprising an edge having barbed tabs, whereby said tabs fasten said grille to a vehicle fascia.

19. The vehicle grille of claim 10, further comprising a frame wherein said frame, said upper and lower closures and said horizontal portion are unitary.

20. A vehicle fascia and grille assembly comprising:
a vehicle fascia having a horizontal center portion and generally vertical portions defining an upper air intake opening, and a lower intake opening positioned below said center portion and an impact area; and
a vehicle grille having an upper air intake closure closing said upper air intake opening, a lower intake closure closing said lower intake opening, and a horizontal portion overlying said fascia horizontal center portion, said grille horizontal portion being recessed from said fascia impact area.

21. The vehicle assembly of claim 20, further comprising fastener retention surfaces on said fascia receiving fasteners on said grille.

22. The vehicle assembly of claim 21, wherein said fastener retention surfaces are slots and said grille fasteners are tabs.

23. The vehicle assembly of claim 20, further comprising an in-turned edge on said fascia and an in-turned edge on said grille forming a seam.

* * * * *